Patented July 4, 1933

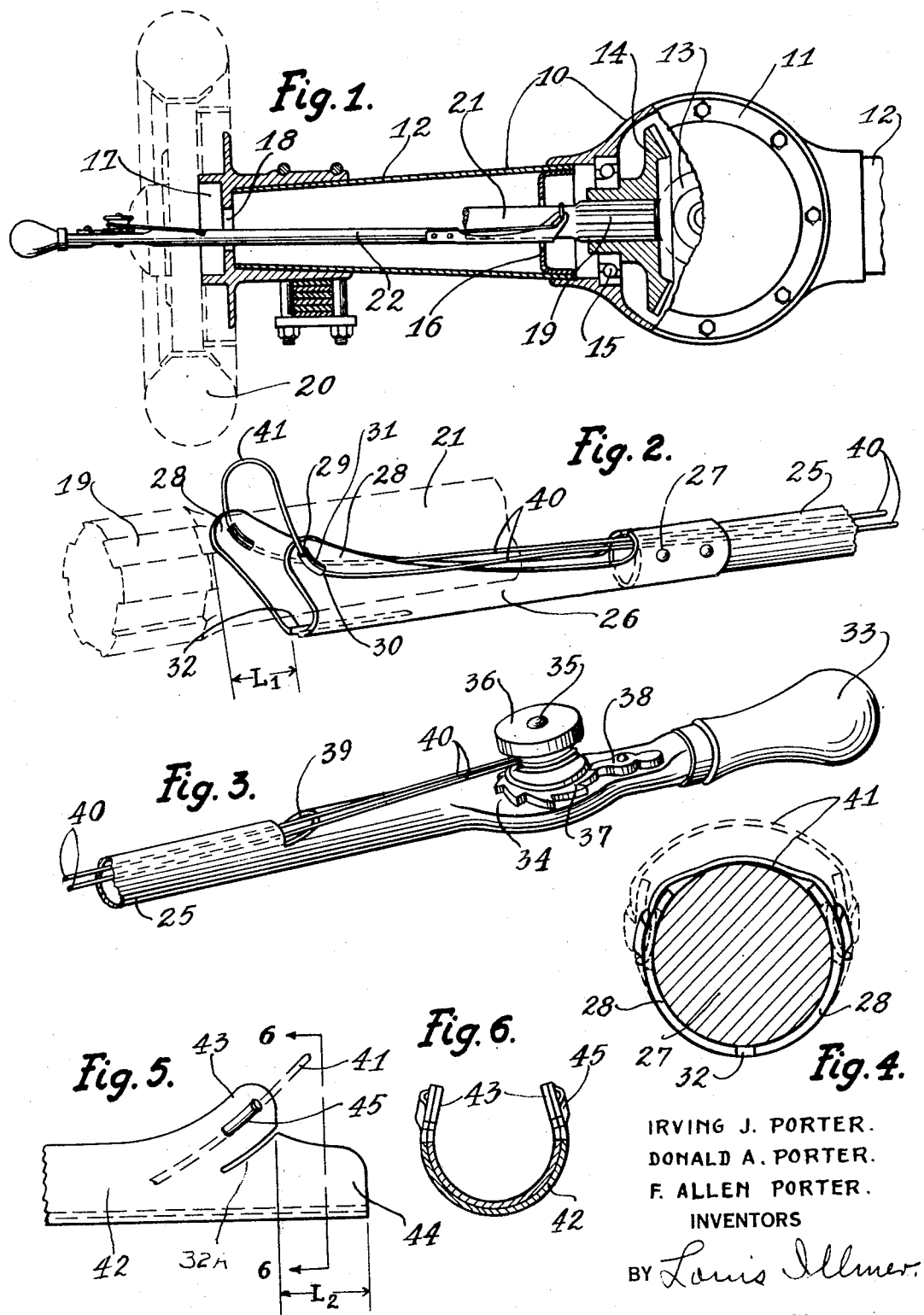

1,916,866

UNITED STATES PATENT OFFICE

IRVING J. PORTER, DONALD A. PORTER, AND FRED ALLEN PORTER, OF CORTLAND, NEW YORK

AXLE PULLER

Application filed July 1, 1932. Serial No. 620,464.

Our invention relates to an improved manipulative tool or implement adapted to expedite the removal of a broken drive axle for repair purposes, and more specifically pertains to an elongated sheet metal, gripping device of which the leading extremity is trough shaped and designed to freely enter the contracted wheel end region of an opened tubular differential gear housing of an automobile or truck chassis and thereby bring said device into a self-centered grapple-like hold around the perimeter of the innermost and normally inaccessible length section of an axle stump; thence to slidably withdraw the grasped axle section from its associated gear hub and thus make the chassis ready for the reception of a replacement axle at the minimum of time and labor. Our device preferably comprises a pair of spaced gripping jaws that are yieldably interconnected by yoke means and which jaws are sprung inwardly against the interposed axle stump by snare strand means.

The object of our improvements is to provide for a simple and effective repair accessory of the character indicated, comprising a reach rod having adjustable clamping jaws disposed at one end region thereof and remote manipulative control means at the other rod end, said jaws being compactly arranged to reach inwardly through a relatively small housing bore and slidably bring forth the stump section of a broken shaft therethrough. A single model of our tool is adapted to be used for a range of axle sizes.

Embodied herein are other associated appurtenances designed to facilitate the manufacture and application of our device to its intended purpose or the like. Reference is had to the accompanying one sheet of drawing, which is illustrative of certain alternative embodiments of our invention, in which drawing:

Fig. 1 illustrates in partial vertical section, a fragmental view of a differential gear housing having the vehicle wheel removed and our tool operatively inserted into the opened outermost housing end.

Figs. 2 and 3 respectively show in enlarged scale, opposite fragmental end portions of our axle removing tool, while Fig. 4 schematically represents a cross-sectional end view of the tool jaws as clasped around a broken axle stump.

Fig. 5 shows a modified jaw end of our tool and Fig. 6 is a cross-sectional view as taken along the line 6—6 of Fig. 5.

Referring in detail to the drawing, Fig. 1 discloses a conventional automobile rear drive axle housing 10 which may comprise a central spherical casing member 11 and complementary aligned tubular extensions such as 12 that oppositely overhang from the casing sides for a considerable length, as shown. Within said casing there may be enclosed the differential gears including a propeller shaft gear 13 and an axle side gear 14. The hub exterior of the last named gear is preferably mounted by inner axle bearings such as 15, the gear hub bore being generally broached to provide for a plurality of axially disposed splines. The innermost end of each extension may be reenforced by a transverse head having a relatively small aperture 16 therethrough. The outermost or free end of each extension is usually equipped with an outer ball race socket 17 including an inturned bearing flange having a relatively small, concentric entrance hole 18 therethrough.

As will be understood, a continuous drive shaft or axle normally extends centrally through and between the inner bearing 15 and the outermost housing bearing. The innermost end of said axle is commonly provided with splines 19 that slidably intermesh with those of the gear 14, while the other axle end detachably carries the vehicle wheel 20 which is schematically indicated by dotted outline. When said wheel is removed, this opens and exposes to view the socket 17. In the event the drive shaft should break and become parted in service, the foremost or wheel carrying section can readily be removed but this still leaves in place, the complementary broken stump or remote axle section 21 which is likely to lie far inward with respect to the axially aligned flange hole 18. It is the purpose of our tool to conveniently reach interiorly of the housing extension 12 and remove this stump section forwardly through its contracted flange hole.

To this end, our tool which is in its entirety designated as 22 in Fig. 1, preferably comprises a rigid tubular reach rod 25, which in Figs. 2 and 3 is shown fractured for convenience of illustration but in reality constitutes a common aligned rod of considerable length. The leading rod end shown in Fig. 2 preferably includes a relatively thin, sheet metal, spoon-shaped grip member 26 of which the rear or shank end region may be overhangingly secured to the rod by rivets 27 or the like. The outermost free or leading end of the spoonlike member is preferably forked to terminate in a pair of flexible upturned lip extensions or resilient gripping jaws such as 28, of which the rounded extremities are respectively apertured in spaced relation as at 29 or 30. The edges of said apertures may be distorted to align with the struck up or raised troughlike tunnel 31 and unobstructedly pass a snare strand therethrough in long radius fashion so as to gradually turn the snare loop from a transverse into a direction parallel to the rod axis. The interconnecting yoke region of said jaws is preferably set back with respect to the jaw extremities by the distance L1 and slotted at 32 longitudinally inward toward the rod so as to impart augmented flexibility to the upstanding jaws.

Referring now to the rod structure, the rearmost free end thereof may be equipt with a handle 33 and contiguous thereto, there is provided a flattened tube surface 34 through which extends a laterally disposed pin 35 adapted to mount a reel 36 thereon. Adjacent to said surface, the reel carries a ratchet wheel 37 which cooperates with a releasable spring actuated ratchet pawl 38. Medially of the rod ends, the tube is provided with a side opening 39 into the tube interior. A continuous snare strand 40, preferably made of fine piano wire, is threaded through each of the jaw apertures 30 and 29 to constitute a solitary looped hitch or jaw bridging portion 41. It will be observed that the loop terminal regions are exteriorly entered into the respective apertures 30 and through the tunnel 31, thence the respective snare ends may be carried rearwardly interiorly of the tubular rod 25 and out through the side opening 39, whereupon the free lead ends are wound upon the reel 36 to provide for a remote control adapted to actuate said jaws. These lead ends may also be run exteriorly of a solid rod, if so desired.

The mode of operation of our device may be traced as follows: Prior to using our tool the gap between the jaws 28 may be sprung or bent to a spacing that will freely slip over the overhanging end of the broken axle stump 21 with the loop hitch 41 kept relatively loose. The grip member 26 has now been bodily entered through the exposed contracted hole 18 while the unentered reel remains available for manipulation. By feel on part of the user, the loop hitch and cooperating jaws are brought into the overlapping, embraced relationship that is shown in Figs. 1 and 4. The leading end of our puller device is purposely so shaped to make it self-centering and this facilitates the finding of the stump end while groping therefor. By now manipulating the reel and drawing taut the snare strand 40, this will take up the loop hitch slack and draw the flexible jaws 28 inwardly and snugly against the interposed stump end, thus affording a tight grip for pulling purposes. The spline interconnection 19 with the gear 14, allows the axle stump to be slidably withdrawn by pulling outwardly upon the handle 32. During this operation, the reel ratchet 36 serves to maintain the snare strands under the desired tension.

It will be observed that in our axle puller tool, a solitary strand loop is operatively disposed between but two upstanding gripping jaws which are yoke interconnected, also that this yoke element is made to partially embrace and seat around the interposed stump while the loop hitch is arranged to complete such perimetric embrace about said stump end.

After removal of the stump, a replacement rear drive shaft may now be inserted and the wheel 20 put back into place. While making such repair, it will be obvious that the tubular housing 12 is first jacked up and that the vehicle rests upon its other wheels thus saving considerable time and labor over that required to dismantle the differential housing in order to gain access to such broken stump. Our tool has been found capable of withdrawing stumps where its exposed grip length is less than the axial diameter. In certain prevailing automobile or truck installations, the entrance hole 18 fits rather snugly about its axle and provides comparatively little manipulative room therearound; to meet this contingency, our grip member 26 may be made of thin sheet-metal and the snare strand 40 kept correspondingly fine in size.

While the foregoing description has been directed to what we now deem the preferred embodiment of our tool, this may however, be modified to suit circumstances. As applied to heavier shafts for other than vehicle purposes, it may be expedient to resort to a laminated grip member such as is designated 42 in Figs. 5 and 6. This leaf type of body augments the resiliency of the jaws 43 as compared to an equivalent solid sheet metal structure and hence offers less opposition to snare pull. The body toe 44 is here extended forward of said jaws by the distance L2, the jaws now being severed by complementary oblique slots such as 32A. The snare strand may again be threaded through the tunnel 45 in a manner identical with that previously set forth. It will be obvious that such slotting may be omitted or disposed in various other ways; if preferred, oppositely disposed jaws may likewise be carried by separately formed pronglike extensions that respectively reach outwardly from the rod 25.

The foregoing disclosure makes apparent the intended construction and advantages inherent in our improvements, it being understood that we reserve the right to vary the size, shape and disposition of the more novel features thereof, all without departing from the spirit and scope of our invention as defined by the appended claims.

We claim:

1. In a tool for axle repair purposes, said tool comprising a reach rod having an axle gripping member disposed at one end region of the rod and which member includes a pair of adjustably spaced clamping jaws respectively equipt with eye means and which jaws are interconnected by yoke means arranged to seat upon and partially encircle the gripped axle, a remote manipulative control associated with said rod, and snare strand means threaded through said eyes to constitute a solitary loop hitch extending between said eyes and serving to complete the encirclement of the gripped axle, the loop hitch extremities being operatively interconnected with said control.

2. In a tool adapted to reach into and remove the stump section of a broken axle through a contracted tubular housing, said tool comprising relatively thin, sheet metal sleeve means adapted to be entered through the housing contraction and which sleeve includes a yieldable yoke provided with a pair of adjustable clamping jaws respectively equipt with eyes and laterally spaced to embrace the stump therebetween, a snare strand operatively threaded through said eyes to constitute a solitary loop hitch that is solely supported by said pair of jaws, and control means for said strand serving to contract said loop hitch through the aforesaid eyes and draw the yoke into gripping engagement about the interposed stump.

3. In a repair tool adapted to withdraw the stump section of a broken axle of which section one end region is slip fitted into a cooperating gear, said tool comprising a sheet metal, troughlike member of which the side walls are respectively extended into a pair of gripping jaws each provided with long turn tunnel means arranged obliquely of said side walls and which jaws are disposed to clamp the other of the section ends therebetween, and a snare strand freely threaded through said tunnels to constitute a loop hitch about said stump and serving to augment the jaw grip while withdrawing the stump from said gear.

4. In an axle puller implement of the groping type adapted to be entered through a contracted opening of a tubular housing which surrounds a sectional axle lying longitudinally inward of said opening, the combination of a reach rod of which the leading region is provided with a spoon-shaped yoke member having a pair of adjustable, interconnected gripping jaws that are upturned in relation to the rod axes and initially spaced apart to freely receive an axle end therebetween, said leading end region of said member being shaped to center itself while being brought into overlapping embraced position about said axle end, and means serving to draw the jaws inwardly into a gripping relationship with said centered axle.

5. An axle puller implement comprising a reach rod and an attached spoon-shaped member including a pair of resilient clamping jaws extending axially beyond said rod and adapted to grip an axle section therebetween, said member being slotted intermediate said jaws to augment the resiliency thereof, and a snare strand serving to spring said jaws inwardly against the gripped axle section.

6. An axle puller implement comprising a reach rod and an attached spoon-shaped member including a pair of resilient clamping jaws extending axially beyond said rod and adapted to grip an axle section therebetween, said member being built up into a laminated structure to augment the resiliency of said jaws, and a snare strand serving to spring said jaws inwardly against the gripped axle section.

7. An axle puller implement comprising a tubular reach rod having a site opening between the ends thereof and one end region of which tubular rod is provided with a pair of yoke interconnected gripping jaws serving to clamp the axle, a snare strand arranged to constitute a solitary loop hitch extending between said jaws, and reel means associated with the remote end of said rod which reel is wholly disposed exteriorly of said rod and serves to tension the respective free snare strand ends, said strand ends being threaded interiorly of the aforesaid one tubular rod end and through the rod side opening for connection to the reel.

8. An axle puller implement comprising a reach rod of which one end portion carries a spoon-shaped extension which terminates in a pair of apertured clamping jaws adapted to grip an axle therebetween, a snare strand threaded exteriorly through the respective jaw apertures to provide for a loop hitch, and manipulative reel means disposed at the remote end region of said rod, said strand being operatively carried to said reel.

9. An axle puller implement comprising a reach rod having a flattened medial rod region and of which rod one end portion carries a sheet metal extension provided with a pair of manipulative clamping jaws adapted to grip an axle therebetween, handle means associated with the remote end of said rod, reel means including a fulcrum pin mounted within said flattened rod region, and snare strand means operatively interconnecting said reel with both of the jaws.

In testimony whereof, we have signed our names to this specification.

IRVING J. PORTER.
DONALD A. PORTER.
F. ALLEN PORTER.